US012717442B1

(12) United States Patent
Tsai

(10) Patent No.: US 12,717,442 B1
(45) Date of Patent: Aug. 25, 2026

(54) TOUCH CONTROLLER AND METHOD FOR DYNAMICALLY ADJUSTING SENSOR ELECTRODE AREA OR SENSOR ELECTRODE SCAN TIME TO PERFORM ACTIVE PEN DETECTION BASED ON OBJECT TOUCH POSITION

(71) Applicant: PixArt Imaging Inc., Hsin-Chu City (TW)

(72) Inventor: Ming-Hung Tsai, Hsin-Chu City (TW)

(73) Assignee: PixArt Imaging Inc., Hsin-Chu City (TW)

( * ) Notice: Subject to any disclaimer, the term of this patent is extended or adjusted under 35 U.S.C. 154(b) by 0 days.

(21) Appl. No.: 19/209,715

(22) Filed: May 15, 2025

(51) Int. Cl.
*G06F 3/041* (2006.01)
*G06F 3/0354* (2013.01)
*G06F 3/038* (2013.01)
*G06F 3/044* (2006.01)

(52) U.S. Cl.
CPC .... *G06F 3/041661* (2019.05); *G06F 3/03545* (2013.01); *G06F 3/038* (2013.01); *G06F 3/0446* (2019.05)

(58) Field of Classification Search
CPC ...... B67D 1/0081; B67D 1/04; B67D 1/0431; B67D 1/0437; B67D 1/0882; B67D 1/0888; B67D 1/1222; B67D 1/1243; B67D 2001/0089; B67D 2001/0493
See application file for complete search history.

(56) References Cited

U.S. PATENT DOCUMENTS

| | | | | |
|---|---|---|---|---|
| 4,429,304 A * | 1/1984 | Fujita | G09G 3/18 345/95 |
| 2015/0070297 A1* | 3/2015 | Mao | G06F 3/0446 345/174 |
| 2016/0266694 A1* | 9/2016 | Lee | G06F 3/04166 |
| 2017/0153748 A1* | 6/2017 | Choi | H03K 17/962 |

FOREIGN PATENT DOCUMENTS

| | | |
|---|---|---|
| CN | 114115581 A | 3/2022 |
| CN | 116185230 A | 5/2023 |
| TW | I766437 B | 6/2022 |
| TW | I834507 B | 3/2024 |

* cited by examiner

*Primary Examiner* — Chun-Nan Lin
(74) *Attorney, Agent, or Firm* — Winston Hsu

(57) ABSTRACT

A method of a touch controller for controlling a touch panel device includes; providing a dual mode in which a capacitive touch sensing operation in a touch sensing mode is used to sense an object's touch position while an active pen detection in a stylus detection mode is used to detect an active pen's signal; using a driving circuit to output driving signals into sensor electrodes placed along a first axis in the touch sensing mode; using a sensing circuit to receiving sensing signals from sensor electrodes placed along a second axis in the touch sensing mode; and, in the stylus detection mode, dynamically determining and enabling a portion of sensor electrodes for sensing the active pen or dynamically determining a sensor electrode scan time for sensing the active pen according to the object's touch position sensed by the capacitive touch sensing operation.

20 Claims, 4 Drawing Sheets

TOUCH CONTROLLER AND METHOD FOR DYNAMICALLY ADJUSTING SENSOR ELECTRODE AREA OR SENSOR ELECTRODE SCAN TIME TO PERFORM ACTIVE PEN DETECTION BASED ON OBJECT TOUCH POSITION

BACKGROUND OF THE INVENTION

1. Field of the Invention

The invention relates to a touch sensing mechanism, and more particularly to a touch controller and corresponding method.

2. Description of the Prior Art

A conventional touch panel device is designed to enable its all sensor electrodes to detect an active pen's signal. This inevitably consumes more power and degrades the performance.

SUMMARY OF THE INVENTION

Therefore, one of the objectives of the invention is to provide a touch controller and a corresponding method for controlling a touch panel device, to solve the above-mentioned problems.

According to the embodiments, a touch controller for controlling a touch panel device is disclosed. The touch panel device comprises multiple sensor electrodes, and the touch controller comprises a control circuit, a driving circuit, and a sensing circuit. The control circuit provides a dual mode in which a capacitive touch sensing operation in a touch sensing mode is used to sense an object's touch position while an active pen detection in a stylus detection mode is used to detect an active pen's signal. The driving circuit, coupled to the control circuit, is controlled by the control circuit to output driving signals into sensor electrodes placed along a first axis in the touch sensing mode. The sensing circuit, coupled to the control circuit, is controlled by the control circuit to receiving sensing signals from sensor electrodes placed along a second axis in the touch sensing mode. The control circuit in the stylus detection mode is used to dynamically determine and enable a portion of sensor electrodes for sensing the active pen or to dynamically determine a sensor electrode scan time for sensing the active pen according to the object's touch position sensed by the capacitive touch sensing operation.

According to the embodiments, a method of a touch controller for controlling a touch panel device is disclosed. The touch panel device comprises multiple sensor electrodes. The method comprises; providing a dual mode in which a capacitive touch sensing operation in a touch sensing mode is used to sense an object's touch position while an active pen detection in a stylus detection mode is used to detect an active pen's signal; using a driving circuit to output driving signals into sensor electrodes placed along a first axis in the touch sensing mode; using a sensing circuit to receiving sensing signals from sensor electrodes placed along a second axis in the touch sensing mode; and, in the stylus detection mode, dynamically determining and enabling a portion of sensor electrodes for sensing the active pen according to the object's touch position sensed by the capacitive touch sensing operation.

According to the embodiments, a method of a touch controller for controlling a touch panel device is disclosed. The touch panel device comprises multiple sensor electrodes. The method comprises; providing a dual mode in which a capacitive touch sensing operation in a touch sensing mode is used to sense an object's touch position while an active pen detection in a stylus detection mode is used to detect an active pen's signal; using a driving circuit to output driving signals into sensor electrodes placed along a first axis in the touch sensing mode; using a sensing circuit to receiving sensing signals from sensor electrodes placed along a second axis in the touch sensing mode; and, in the stylus detection mode, dynamically determining a sensor electrode scan time for sensing the active pen according to the object's touch position sensed by the capacitive touch sensing operation.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a technical solution of a touch controller and corresponding method capable of dynamically determining/predicting and adjusting the a sensor electrode area for the execution of a stylus detection such as an active pen detection (e.g. a portion of panel range/area for sensing signals from and transmitting signals into an active pen) and/or capable of dynamically determining and adjusting a sensor electrode scan time (i.e. scan time length) of sensing of different sensor electrodes for the execution of the active pen detection according to the object's touch position sensed by a capacitive touch sensing operation. This can significantly improve the signal-to-noise ratio (SNR), save more power, decrease the calculation complexity, and improve the efficiency.

Figure 1:
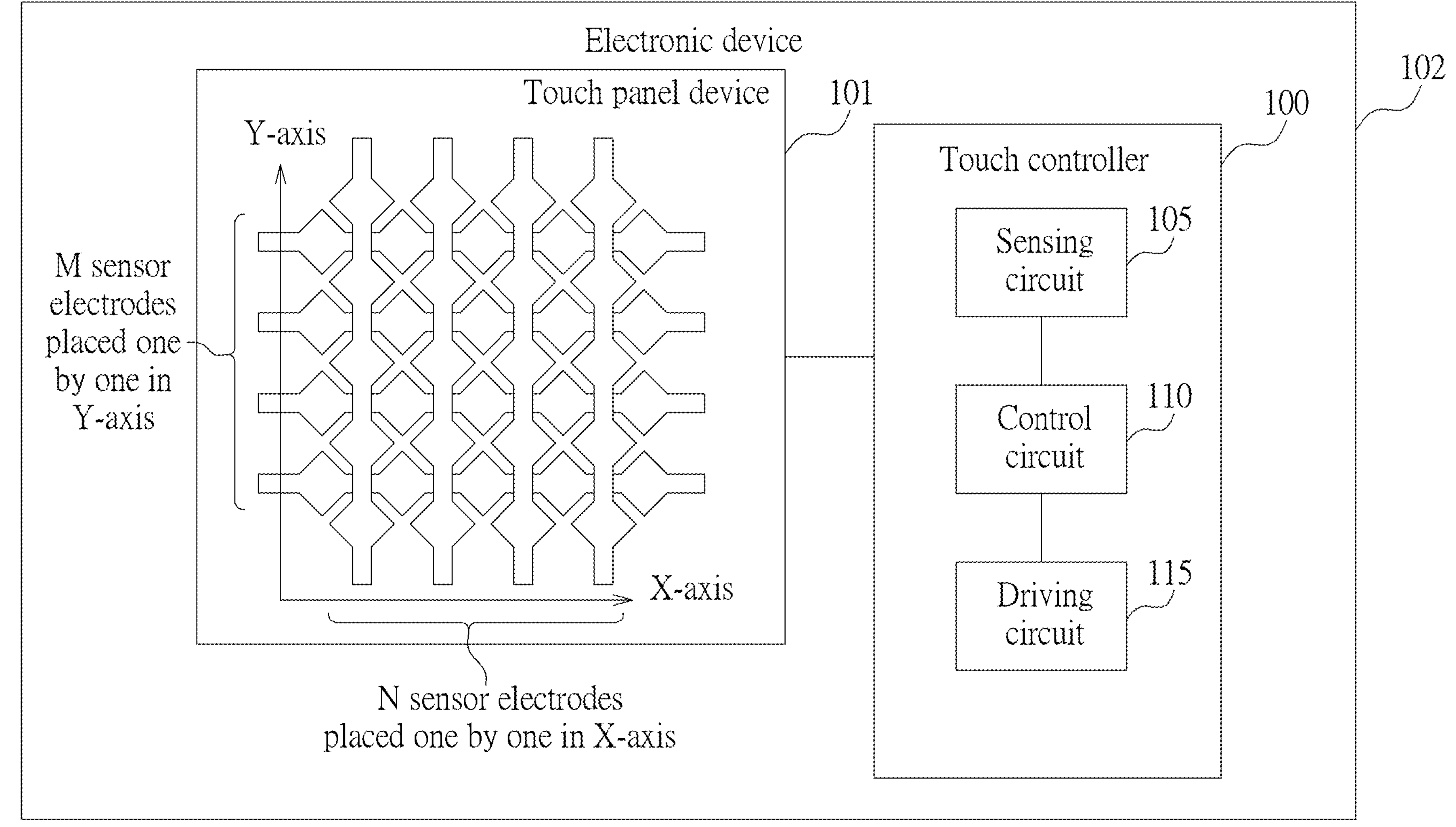
FIG. 1 is a diagram of a touch controller used for controlling a touch panel device according to an embodiment of the invention.

FIG. 1 is a diagram of a touch controller 100 used for controlling a touch panel device 101 according to an embodiment of the invention. The touch controller 100 and touch panel device 101 may be comprised by an electronic device 102 such as a touch screen device, touch pad, or a tablet device.

The touch panel device 101 comprises multiple sensor electrodes such as X-axis sensor electrodes (i.e. the N sensor electrodes placed in parallel and vertically one by one along the X-axis) and Y-axis sensor electrodes (i.e. the M sensor electrodes placed in parallel and horizontally one by one along the Y-axis). The numbers N and M can be identical or different. The sensor electrodes are primary sensing elements that are used to detect touch inputs, to form the capacitive sensing areas of the touch panel device 101. For example, the sensor electrodes are arranged in a grid pattern (rows and columns) and can be made of transparent conductive materials in visible areas. The sensor electrodes directly interact with the user's finger or a stylus (e.g. an active pen) to detect position, and can be designed with specific patterns such as diamond or snowflake to optimize sensing performance. The example of sensor electrodes shown in FIG. 1 is merely an example for illustrative purposes and is not intended to be a limitation of the invention.

Further, the touch panel device 101 comprises multiple electrode traces (not shown in FIG. 1), and the electrode traces are used to correspondingly connect the sensor electrodes to the touch controller 100, to act as conductive pathways/routing between sensor electrodes and the touch controller 100. As shown in FIG. 1, for example, the sensor electrodes are arranged in M rows and N columns such as the Y-axis sensor electrodes in M rows and the X-axis sensor electrodes in N columns, so that the corresponding electrode traces are arranged in M rows and N columns to connect the sensor electrodes into the touch controller 100.

The touch controller 100 comprises a sensing circuit 105, a control circuit 110, and a driving circuit 115. The touch controller 100 (or control circuit 110) provides and includes a dual mode comprising a touch sensing mode and a stylus detection mode. In the touch sensing mode, the control circuit 110 controls the driving circuit 115 and sensing circuit 105 to perform a capacitive touch sensing operation to sense an object's touch position, e.g. the user's finger position (or palm position). In the stylus detection mode such as an active pen detection mode, the control circuit 110 controls the sensing circuit 105 to perform an active pen detection to detect an active pen's signal. The touch controller 100 is used to alternatively perform the capacitive touch sensing operation and the active pen detection in the dual mode so as to more accurately sense the position and/or behavior of the active pen according to the object's touch position sensed by the capacitive touch sensing operation.

In practice, in one embodiment (but not limited), the control circuit 110 of touch controller 100 operating in the touch sensing mode is arranged to control the driving circuit 115 to provide drive signals into a portion of all the sensor electrodes through corresponding electrode traces, and then control the sensing circuit 105 to receive sensing signals from the other portion of all the sensor electrodes through corresponding electrode traces, so as to perform the capacitive touch sensing operation. Then, the control circuit 110 of touch controller 100 operating in the stylus detection mode is arranged to select and enable only a portion of sensor electrodes according to the object's touch position sensed by the capacitive touch sensing operation, and then is used to control the sensing circuit 105 to receive the sensing signals from only the enabled portion of sensor electrodes so as to perform the active pen detection to detect the active pen's signal. Thus, a large amount of power can be saved, and the calculation complexity of the touch controller 100 can be effectively decreased.

For example, in the touch sensing mode of the dual mode, the touch controller 100 may provide drive signals into all the X-axis sensor electrodes (i.e. the N sensor electrodes having serial numbers from 1-N along the X-axis (but not limited)) through corresponding electrode traces, and then receive sensing signals from all the Y-axis sensor electrodes (the M sensor electrodes having serial numbers from 1 to M along the Y-axis (but not limited)) through corresponding electrode traces, so as to perform the capacitive touch sensing operation. That is, in this example, the capacitive touch sensing operation is arranged to enable all the sensor electrodes of touch panel device 101.

Figure 2:
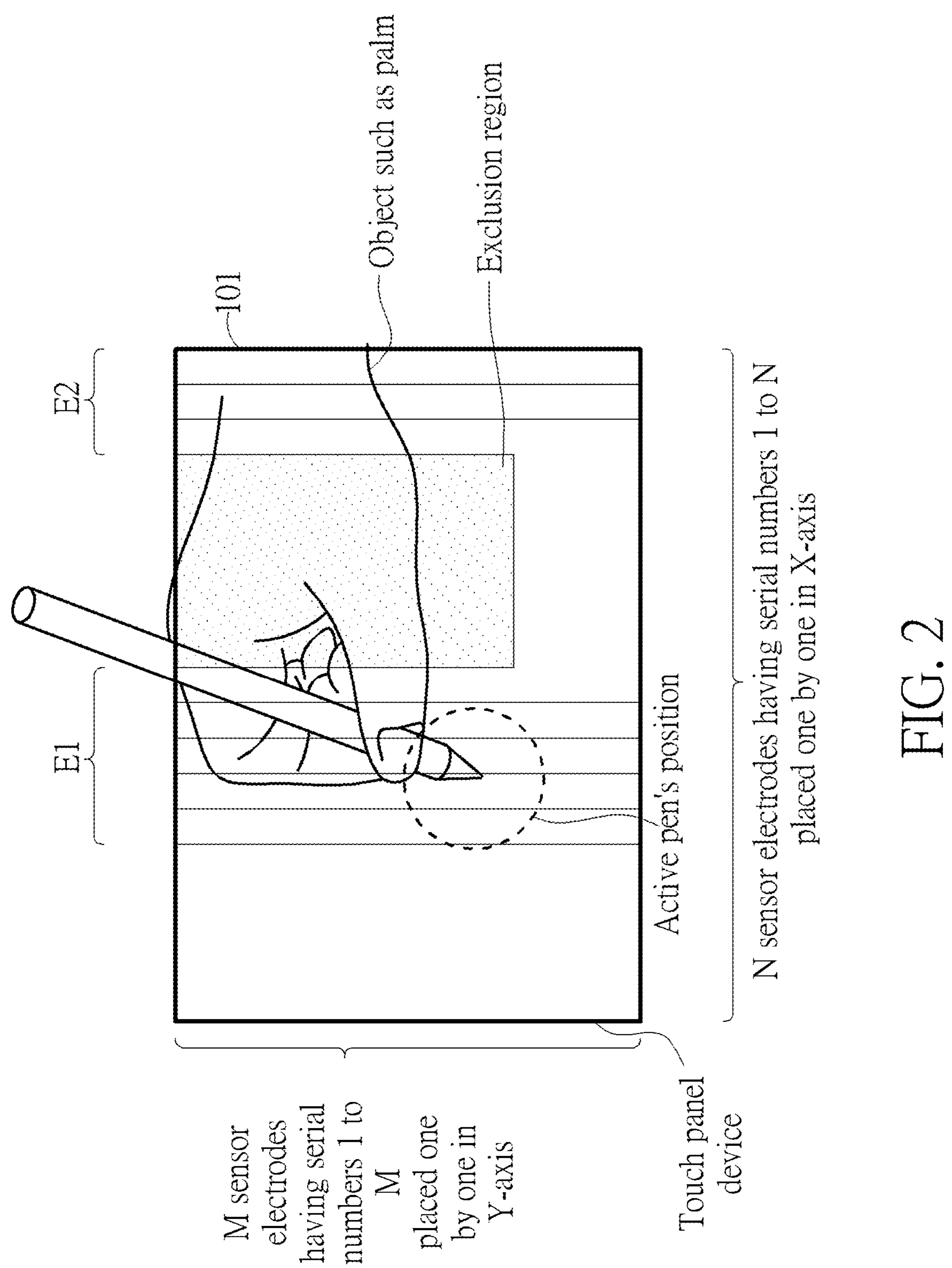
FIG. 2 is a diagram of the operation of touch controller selecting and enabling only a portion of sensor electrodes of the touch panel device to perform the active pen detection according to an embodiment of the invention.

FIG. 2 is a diagram of the operation of touch controller 100 selecting and enabling only a portion of sensor electrodes of the touch panel device 101 to perform the active pen detection according to an embodiment of the invention.

In the stylus detection mode of the dual mode, the touch controller 100 (or control circuit 110) is arranged to select and enable a portion of the sensor electrodes, e.g. a portion of the N sensor electrodes along the X-axis such as the sensor electrodes having the serial numbers from n1 to n2, and the numbers n1 and n2 are not greater than the number of N. Then, the control circuit 110 controls the sensing circuit 105 to receive sensing signals from the enabled sensor electrodes having the serial numbers from n1 to n2. For example, as shown in FIG. 2, the touch controller 100 may enable the group E1 of X-axis sensor electrodes and/or the group E2 of X-axis sensor electrodes to receive sensing signals from the group(s) E1 and/or E2 of X-axis sensor electrodes to perform the active pen detection. The selected and enabled sensor electrodes in the stylus detection mode are not within an exclusion region. By doing so, it is not needed to enable all or a large portion of X-axis sensor electrodes for the execution of the active pen detection. The power consumption can be reduced, and the performance of active pen detection can be more accurate and efficient.

As shown in FIG. 2, equivalently, the touch controller 100 enables the sensor electrodes corresponding to a first panel area of the touch panel device 101 when it is in the touch sensing mode to perform the capacitive touch sensing operation to sense the object's touch position, and the first panel area for example is equal to the whole panel area of the touch panel device 100. Alternatively, if an object's touch position is detected, the touch controller 100 equivalently enables the sensor electrodes corresponding to a second panel area of the touch panel device 101 when it is in the stylus detection mode to perform the active pen detection to detect the active pen's signal based on the sensed object's touch position, so as to calculate and output the active pen's position to the touch panel device based on the active pen's signal. If no objects' touch positions are detected, the touch controller 100 may enable the sensor electrodes corresponding to a second panel area of the touch panel device 101 when it is in the stylus detection mode to perform the active pen detection to detect the active pen's signal, and in this situation the second panel area may be whole panel area of the touch panel device 100.

For example, the second panel area may comprise the group E1 of X-axis sensor electrodes and/or the group E2 of X-axis sensor electrodes and exclude the X-axis sensor electrodes corresponding to the exclusion region. The second panel area is smaller than and comprised by the first panel area such as the whole panel area. The second panel area (i.e. the group E1 and/or group E2) is neighboring to the exclusion region corresponding to (or is determined based on) the sensed object's touch position. The exclusion region is associated with a palm rejection function. When the user interacts with the touch panel device 101 by using the active pen or a finger, the user's palm may inadvertently rest on the screen of the touch panel device 101. The touch controller 100 (or control circuit 110) is used to identify and excluding a larger contact area based on the sensed object's touch position by analyzing the contact size and shape characteristics, assessing the pressure distribution pattern(s), and/or evaluating the temporal sequence of touch event(s). That is, the second panel area may be comparatively neighboring to and not directly neighboring to the sensed object's touch position; however, this is not meant to be a limitation of the invention.

In addition, the number of sensor electrodes covered by the group E1 can be identical to or different from that covered by group E2. In addition, in a modification embodiment of FIG. 2, the group may comprise the X-axis sensor electrodes arranged from a side of the exclusion region to the boundary (e.g. the left boundary shown in FIG. 2) of the touch panel device 101 while the group E2 may comprise the X-axis sensor electrodes arranged from a different side of the exclusion region to the boundary (e.g. the right boundary shown in FIG. 2) of the touch panel device 101. That is, if the energy-saving effectiveness is not considered, then all the other X-axis sensor electrodes, which are not within the exclusion region, can be scanned by the active pen detection to detect the active pen's signal. If it is needed to consider the power saving requirement, only a portion of all the other X-axis sensor electrodes, which are not within the exclusion region, may be scanned by the active pen detection to detect the active pen's signal.

Figure 3:
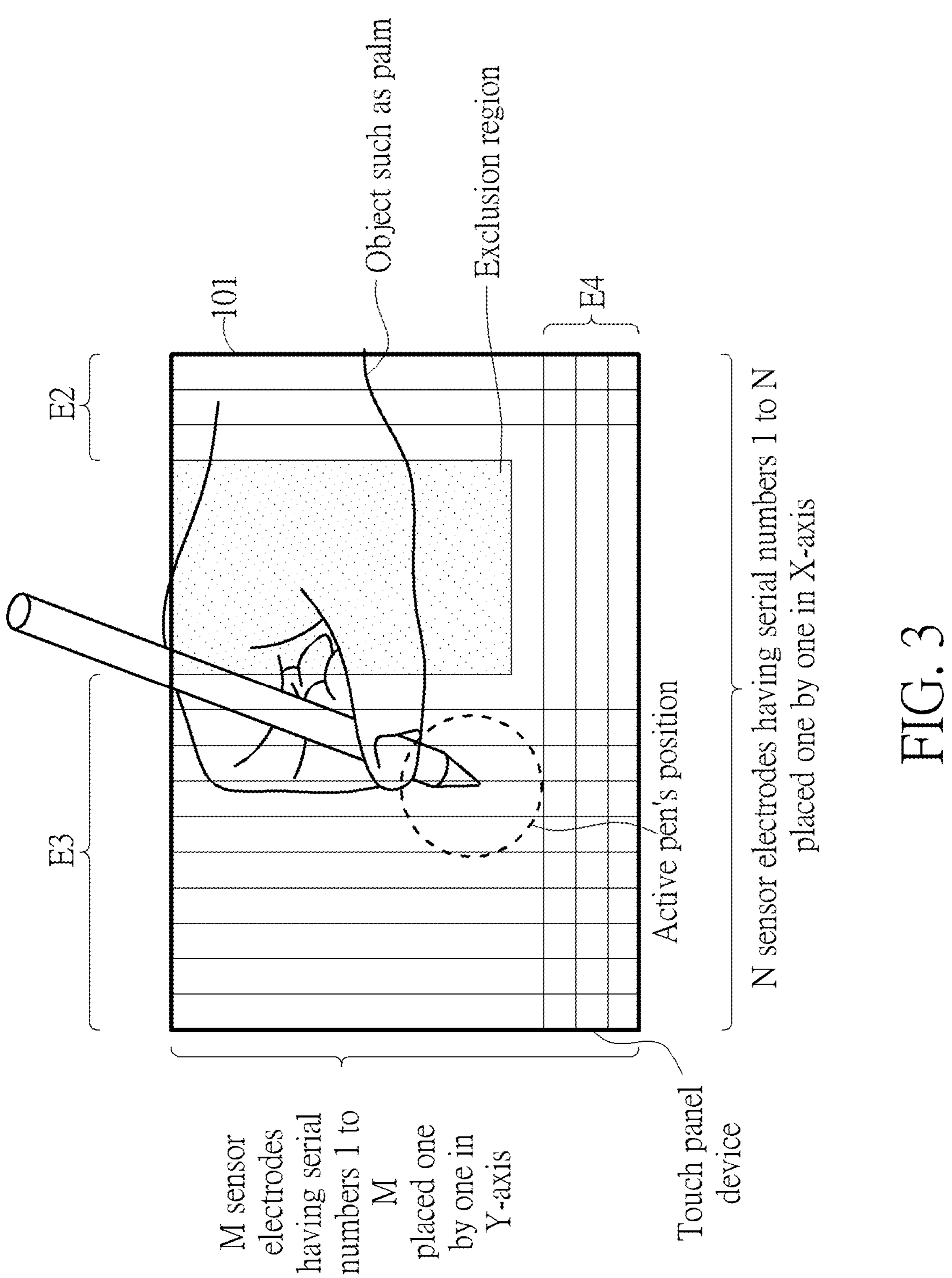
FIG. 3 is a diagram of the operation of touch controller selecting and enabling only a portion of sensor electrodes of the touch panel device to perform the active pen detection according to another embodiment of the invention.

Further, in other embodiments, the second panel area may cover only a neighboring portion of all the Y-axis sensor electrodes which are not within the exclusion region or may cover all the Y-axis sensor electrodes which are not within the exclusion region. The control circuit 110 in the stylus detection mode may be arranged to control the sensing circuit 105 to receive sensing signals from a portion of the M sensor electrodes along the Y-axis (e.g. the sensor electrodes having the serial numbers from m1 to m2) to perform the active pen detection to detect the active pen's signal, and the numbers m1 and m2 are not greater than the number of M. FIG. 3 is a diagram of the operation of touch controller 100 selecting and enabling only a portion of sensor electrodes of the touch panel device 101 to perform the active pen detection according to another embodiment of the invention. As shown in FIG. 3, similarly, in the touch sensing mode of the dual mode, the touch controller 100 provides drive signals into all the X-axis sensor electrodes (i.e. the N sensor electrodes having serial numbers from 1-N along the X-axis (but not limited)) through corresponding electrode traces, and then to receive sensing signals from all the Y-axis sensor electrodes (the M sensor electrodes having serial numbers from 1 to M along the Y-axis (but not limited)) through corresponding electrode traces, so as to perform the capacitive touch sensing operation.

In the stylus detection mode of the dual mode, in this embodiment, as shown in FIG. 3, the touch controller 100 (or control circuit 110) may enable the group E3 of X-axis sensor electrodes and/or the group E2 of X-axis sensor electrodes to control the sensing circuit 105 to receive sensing signals from the group(s) E3 and/or E2 of X-axis sensor electrodes so as to perform the active pen detection. In FIG. 3, the group E3 may comprise the X-axis sensor electrodes arranged from a side of the exclusion region to the boundary (e.g. the left boundary shown in FIG. 3) of the touch panel device 101, and in one embodiment the touch controller 100 can enable only the group E1 of X-axis sensor electrodes (i.e. only a portion of X-axis sensor electrodes from the left side of the exclusion region to the left boundary of touch panel device 101) rather than the group E3. Further, the touch controller 100 may also enable the group E4 of Y-axis sensor electrodes (i.e. a portion of sensor electrodes horizontally placed one by one along the Y-axis) to receive sensing signals from the group E4 of Y-axis sensor electrodes to perform the active pen detection. The selected and enabled sensor electrodes in the stylus detection mode are not within the exclusion region.

That is, the touch controller 100 can enable all the X-axis sensor electrodes and Y-axis sensor electrodes, which are not within the exclusion region, to perform the active pen detection to detect the active pen's signal. The touch controller 100 may enable only all the X-axis sensor electrodes, which are not within the exclusion region, to perform the active pen detection to detect the active pen's signal. The touch controller 100 may enable only all the Y-axis sensor electrodes, which are not within the exclusion region, to perform the active pen detection to detect the active pen's signal. The touch controller 100 may enable only a neighboring portion of the X-axis sensor electrodes, which are and neighboring to and not within the exclusion region, to perform the active pen detection to detect the active pen's signal. The touch controller 100 may enable only a neighboring portion of the Y-axis sensor electrodes, which are and neighboring to and not within the exclusion region, to perform the active pen detection to detect the active pen's signal. The touch controller 100 may enable a neighboring portion of the X-axis and Y-axis sensor electrodes, which are and neighboring to and not within the exclusion region, to perform the active pen detection to detect the active pen's signal. By doing so, it is also not needed to enable all or a large portion of X-axis sensor electrodes (or Y-axis sensor electrodes) for the execution of the active pen detection.

In the embodiments of FIG. 2 and FIG. 3, when detecting whether the active pen is approaching, the touch controller 100 (or control circuit 110) can enable the sensor electrodes such as the groups E1, E2, E3, and or E4 adjacent to the exclusion region corresponding to the palm of the user to control the sensing circuit 105 to receive the sensing signals from the enabled sensor electrodes to detect the active pen's signals, and the other sensor electrodes that are not enabled are not used for receiving the active pen's signals. This can significantly save the time required to be used for detecting the active pen's position, and it is not needed to enable all the sensor electrodes comprised by the touch panel device 101 to scan and generate the sensing signals of the active pen.

In a different embodiment of FIG. 2 or FIG. 3, when the active pen's position has been calculated at a previous timing, the touch controller 100 (or control circuit 110) at a next timing may be used for scanning only the second portion of sensor electrodes corresponding to the active pen's position calculated at the previous timing and used for calculating and outputting the active pen's position at the next timing based on only the active pen's signal detected on the selected and enabled second portion of sensor electrodes corresponding to the second panel area, without referring to sensing signals detected on other portions of sensor electrodes. That is, some sensor electrodes, which are not neighboring to the active pen's position calculated at the previous timing, can be disabled or ignored by the touch controller 100 (or control circuit 110) at the next timing. For example, the touch controller 100 at the next timing may calculate and output the active pen's position based on only the information of sensing signals from a portion of enabled sensor electrodes such as E1 or E4 which are neighboring to the active pen's position calculated at the previous timing, without based on the information of sensing signals of the other non-adjacent sensor electrodes such as the group E2. This can effectively avoid that the user' hand (or palm) may be erroneously determined as a new active pen's position and can speed up the calculation of active pen's position detection.

Further, the control circuit 110 may control the sensing circuit 105 to generate the active pen's signal(s) by integrating all sensing signals independently detected on the selected second portion of sensor electrodes corresponding to the second panel area (e.g. E1~E4 in FIG. 2 and FIG. 3). The control circuit 110 may control the sensing circuit 105 to detect the active pen's signal(s) directly from the selected second portion of sensor electrodes corresponding to the second panel area (e.g. E1~E4 in FIG. 2 and FIG. 3). That is, the touch controller 100 may independently and respectively receive the sensing signals from the portion of enabled sensor electrodes as the active pen's signals or may integrate the sensing signals to obtain an integrated sensing signal as the active pen's signal. The touch controller 100 may respectively receive the analog sensing signals from the portion of enabled sensor electrodes to integrate the received analog sensing signals and then perform a digital conversion upon the integrated analog sensing signals to generate a digital sensing signal as the active pen's signal so as to perform the active pen detection. The touch controller 100 may independently receive the analog sensing signals from the portion of enabled sensor electrodes to respectively perform digital conversions upon the received analog sensing signals and then to integrate the digital-converted sensing signals as the active pen's signal so as to perform the active pen detection.

In a different embodiment of FIG. 2 and FIG. 3, the active pen can generate various types of information during use. For example, when an active pen touches a screen or a touchpad of the electronic device 102, the active pen generates a coding signal which may include the contact information such as precise data about the contact point including coordinates, angle, and pressure information. In addition, the active pen can detect proximity to the screen without actual contact so as to generate a coding signal including hover information. In addition, the active pen may generate a coding signal including the pressure information which indicates how firmly the active pen is pressed against the screen, and the pressure information can be detected by pressure sensors included within the active pen.

In one embodiment, in the stylus detection mode, when the active pen's position has been calculated at a previous timing, the touch controller 100 (or control circuit 110) at a next timing may be arranged to enable only the second portion of sensor electrodes within the second panel area (e.g. the groups E1 and/or E4 in FIG. 2 and FIG. 3) neighboring to the active pen's position calculated at the previous timing so as to receive the coding signal(s) generated and transmitted from the active pen. That is, the touch controller 100 at the next timing may receive the coding signal of the active pen detected from the portion of enabled sensor electrodes such as E1 and/or E4 which are neighboring to the active pen's position calculated at the previous timing, without enabling and receiving signals of the other portions of sensor electrodes. This can significantly improve the performance of detection of the coding signal transmitted from the active pen.

Further, the control circuit 110 may control the sensing circuit 105 to receive the coding signal from the active pen by integrating all sensing signals independently detected on the selected second portion of sensor electrodes corresponding to the second panel area (e.g. E1-E4 in FIG. 2 and FIG. 3). The control circuit 110 may control the sensing circuit 105 to detect the coding signal directly from the selected second portion of sensor electrodes corresponding to the second panel area (e.g. E1-E4 in FIG. 2 and FIG. 3). That is, the touch controller 100 may independently and respectively receive the sensing signals from the portion of enabled sensor electrodes as the active pen's coding signals or may integrate the sensing signals to obtain an integrated sensing signal as the active pen's coding signal.

In another different embodiment of FIG. 2 and FIG. 3, when the active pen's position has been calculated at a previous timing, the touch controller 100 (or control circuit 110) in the stylus detection mode at a next timing can enable only the selected second portion of sensor electrodes corresponding to the active pen's position calculated at the previous timing to control the driving circuit 115 to use only the enabled sensor electrodes corresponding to the active pen's position calculated (e.g. E1 and/or E4 in FIG. 2 and FIG. 3) to transmit a coding signal from the enabled sensor electrodes into the active pen, without using other portions of sensor electrodes to transmit the coding signal. In this situation, the enabled sensor electrodes are used as transmitter electrodes. The coding signal for example may comprise position encoding information, timing synchronization, device identification, parameter configuration, and information of power transmission. This can significantly improve the performance of transmission of the coding signal into the active pen. Further, in practice, the control circuit 110 may control the driving circuit 115 to transmit the coding signal into the active pen through the enabled sensor electrodes by either integrating all signals independently transmitted from the selected second portion of sensor electrodes corresponding to the second panel area or transmitting the coding signal directly from the selected second portion of sensor electrodes corresponding to the second panel area.

Based on the embodiments of FIG. 2 and FIG. 3 mentioned above, by dynamically determining and adjusting the sensing region (or transmitting region) of signals communicated between the active pen and touch panel device 101, the touch controller 100 can decrease the noise interference generated from the user's hand (or palm), shorten the scan time length of the sensor electrodes, and avoid the misjudgment of the position of the active pen.

Further, in the following embodiments, the touch controller 100 may be arranged to dynamically adjust and determine the scan time lengths of different sensor electrodes, so as to improve the anti-noise capability and the scan efficiency.

Figure 4:
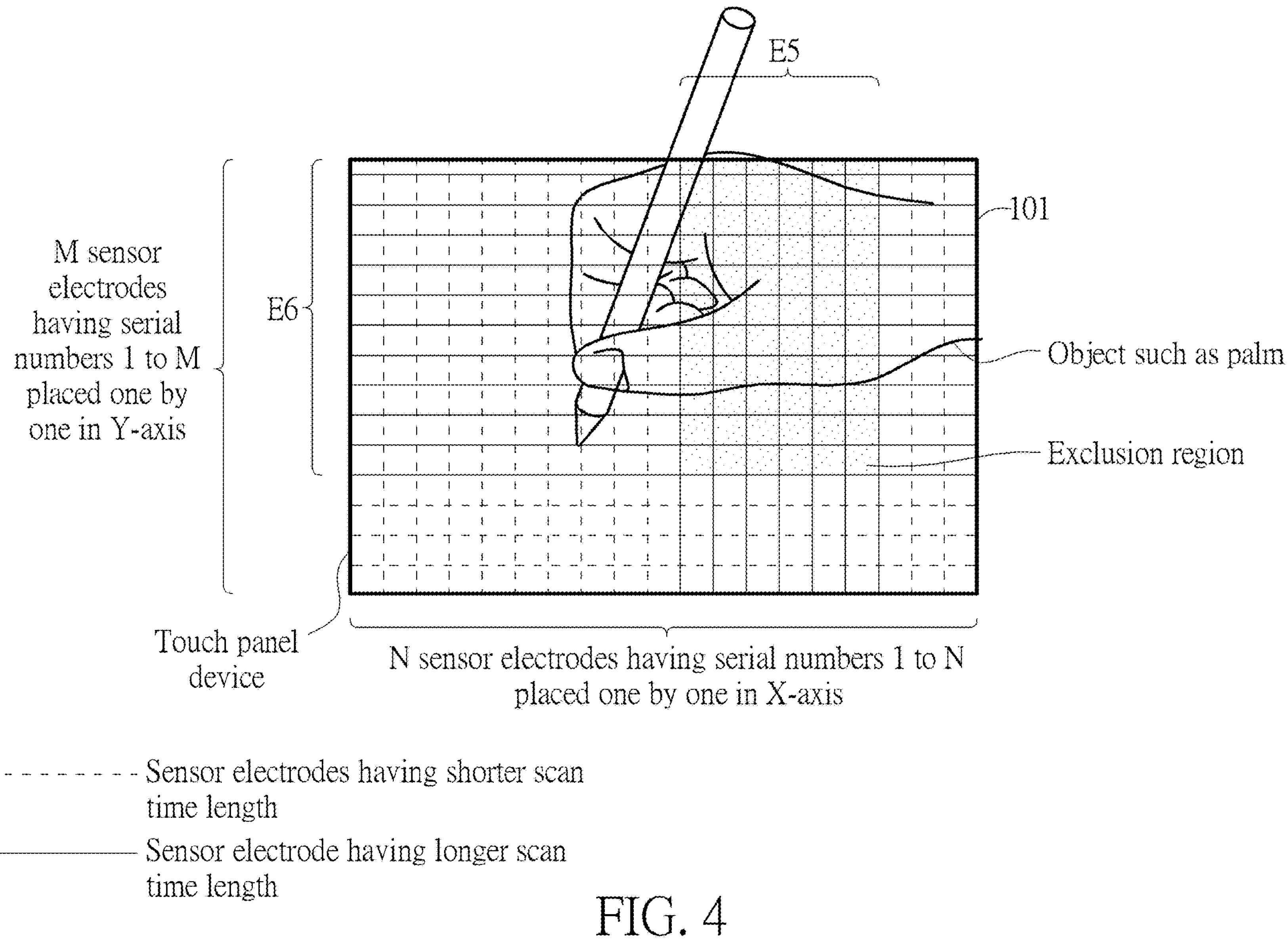
FIG. 4 is a diagram of the touch controller dynamically adjusting the scan time lengths of different sensor electrodes according to an embodiment of the invention.

FIG. 4 is a diagram of the touch controller 100 dynamically adjusting the scan time lengths of different sensor electrodes according to an embodiment of the invention. As shown in FIG. 4, in the embodiment, when the object's touch is sensed by the capacitive touch sensing operation or the active pen's position has been calculated at a previous timing, the touch controller 100 (or control circuit 110) may be arranged to increase a sensor electrode scan time of a first portion of sensor electrodes corresponding to a panel area in which the object's touch is sensed, to perform the active pen detection to detect the active pen's position. For example (but not limited), the panel area may be the exclusion region corresponding to the object's touch position, and the control circuit 110 increases the sensor electrode scan time of the groups E5 and/or E6 of sensor electrodes which pass through the exclusion region and are indicated by solid lines in FIG. 4, so that the sensor electrode scan time of the first portion of sensor electrodes (e.g. E5 and/or E6) is longer than a sensor electrode scan time of another portion of sensor electrodes (i.e. the other portion of sensor electrodes (indicated by dashed lines in FIG. 4) not passing through the exclusion region).

Further, in one embodiment, when another object's touch is sensed by the capacitive touch sensing operation in the touch sensing mode or the active pen's position has been calculated at a previous timing, the touch controller 100 (or control circuit 110) in the stylus detection mode can increase the sensor electrode scan time of all the multiple sensor electrodes (i.e. all X-axis sensor electrodes and all Y-axis sensor electrodes) comprised by the touch panel device 101 to perform the active pen detection to detect the active pen's position. This can improve the noise filtering effect to suppress the coupled noise generated due to the another object's touch.

In another embodiment, when the active pen's position has been calculated at a previous timing and no other objects' touches are sensed in the touch sensing mode, the touch controller 100 (or control circuit 110) in the stylus detection mode can increase the sensor electrode scan time of all the multiple sensor electrodes (i.e. all X-axis sensor electrodes and all Y-axis sensor electrodes) comprised by the touch panel device 101 to receive a coding signal transmitted from the active pen.

Further, in one embodiment, when the active pen's position has been calculated at a previous timing, the touch controller 100 (or control circuit 110) in the stylus detection mode can increase a sensor electrode scan time of a first portion of sensor electrodes passing through a panel area (i.e. the exclusion region) in which the object's touch is sensed, to receive a coding signal transmitted from the active pen.

In one embodiment, if the sensed signal strength level of the object's touch is too high, then the touch controller 100 (or control circuit 110) in the stylus detection mode may disable the portion of sensor electrodes passing through the exclusion region of the object's touch, so as to avoid noise interference. For example (but not limited), the touch controller 100 (or control circuit 110) in the stylus detection mode may disable a sensor electrode scan time of a first portion of sensor electrodes (e.g. E5 and E6) passing through a panel area (i.e. the exclusion region) in which the object's touch is sensed, to perform the active pen detection to detect the active pen's position when the sensed signal strength of the object's touch is greater than a specific threshold. The sensor electrode scan time of the first portion of sensor electrodes is longer than a sensor electrode scan time of a second portion of sensor electrodes not passing through the exclusion region.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch controller for controlling a touch panel device, the touch panel device comprising multiple sensor electrodes, and the touch controller comprises;

a control circuit, providing a dual mode in which a capacitive touch sensing operation in a touch sensing mode is used to sense an object's touch position while an active pen detection in a stylus detection mode is used to detect an active pen's signal;

a driving circuit, coupled to the control circuit, being controlled by the control circuit to output driving signals into sensor electrodes placed along a first axis in the touch sensing mode; and a sensing circuit, coupled to the control circuit, being controlled by the control circuit to receive sensing signals from sensor electrodes placed along a second axis in the touch sensing mode;

wherein the control circuit is used to dynamically determine and enable a portion of sensor electrodes in the stylus detection mode for sensing the active pen according to the object's touch position sensed by the capacitive touch sensing operation and/or to dynamically determine a sensor electrode scan time for sensing the active pen according to the object's touch position sensed by the capacitive touch sensing operation.

2. The touch controller of claim 1, wherein the control circuit is arranged for:

selecting and enabling merely the portion of sensor electrodes among the multiple sensor electrodes to perform the active pen detection to detect the active pen's signal according to the sensed object's touch position, the enabled portion of sensor electrodes being corresponding to a panel area which is neighboring to an exclusion region that is determined based on the sensed object's touch position, the panel area being smaller than a panel area of the touch panel device; and calculating and outputting the active pen's position to the touch panel device based on the active pen's signal detected on the selected portion of sensor electrodes.

3. The touch controller of claim 2, wherein the control circuit is arranged for:

when the active pen's position has been calculated at a previous timing, calculating and outputting the active pen's position at a next timing based on only the active pen's signal detected on sensor electrodes corresponding to the active pen's position calculated at the previous timing, without referring to signals detected on other portions of sensor electrodes.

4. The touch controller of claim 3, wherein the control circuit is arranged for:

generating the active pen's signal by either integrating all signals independently detected on the selected portion of sensor electrodes corresponding to the panel area or controlling the sensing circuit to detect the active pen's signal directly from the selected portion of sensor electrodes corresponding to the panel area.

5. The touch controller of claim 2, wherein the control circuit is arranged for:

when the active pen's position has been calculated at a previous timing, controlling the sensing circuit to receive a coding signal transmitted from the active pen at a next timing based on sensor electrodes corresponding to the active pen's position calculated at the previous timing, without receiving signals detected on other portions of sensor electrodes.

6. The touch controller of claim 5, wherein the control circuit is arranged for:

controlling the sensing circuit to receive the coding signal of the active pen by either integrating all signals independently received on the selected portion of sensor electrodes corresponding to the panel area or receiving the active pen's signal directly from the selected portion of sensor electrodes corresponding to the panel area.

7. The touch controller of claim 2, wherein the control circuit is arranged for:

controlling the sensing circuit to receive a coding signal transmitted from the active pen based on the selected portion of sensor electrodes corresponding to the panel area and the active pen's position calculated at a previous timing, without receiving signals detected on other portions of sensor electrodes.

8. The touch controller of claim 2, wherein the control circuit is arranged for:

when the active pen's position has been calculated at a previous timing, controlling driving circuit to transmit a coding signal from sensor electrodes corresponding to the active pen's position calculated at the previous timing into the active pen, without using other portions of sensor electrodes.

9. The touch controller of claim 8, wherein the driving circuit is arranged for:

transmitting the coding signal into the active pen by either integrating all signals independently transmitted from the selected portion of sensor electrodes corresponding to the panel area or transmitting the coding signal directly from the selected portion of sensor electrodes corresponding to the panel area.

10. The touch controller of claim 1, wherein the control circuit is arranged for:

controlling the sensing circuit to increase the sensor electrode scan time for all the multiple sensor electrodes comprised by the touch panel device to perform the active pen detection to detect the active pen's position when another object's touch is sensed by the capacitive touch sensing operation or the active pen's position has been calculated at a previous timing.

11. The touch controller of claim 1, wherein the control circuit is arranged for:

controlling the sensing circuit to increase the sensor electrode scan time for all the multiple sensor electrodes comprised by the touch panel device to receive a coding signal transmitted from the active pen when the active pen's position has been calculated at a previous timing.

12. The touch controller of claim 1, wherein the control circuit is arranged for:

controlling the sensing circuit to increase a sensor electrode scan time of a first portion of sensor electrodes passing through a first panel area in which the object's touch is sensed, to perform the active pen detection to detect the active pen's position when the object's touch is sensed by the capacitive touch sensing operation or the active pen's position has been calculated at a previous timing;

wherein the sensor electrode scan time of the first portion of sensor electrodes is longer than a sensor electrode scan time of a second portion of sensor electrodes passing through a second panel area in which the active pen's position is detected.

13. The touch controller of claim 1, wherein the control circuit is arranged for:

controlling the sensing circuit to increase a sensor electrode scan time of a first portion of sensor electrodes passing through a first panel area in which the object's touch is sensed, to receive a coding signal transmitted from the active pen when the active pen's position has been calculated at a previous timing.

14. The touch controller of claim 1, wherein the control circuit is arranged for:

disabling a sensor electrode scan time of a first portion of sensor electrodes passing through a first panel area in which the object's touch is sensed, to perform the active pen detection to detect the active pen's position when a sensed signal of the object's touch is greater than a specific threshold;

wherein the sensor electrode scan time of a first portion of sensor electrodes is longer than a sensor electrode scan time of a second portion of sensor electrodes passing through a second panel area in which the active pen's position is detected.

15. The touch controller of claim 1, wherein the driving circuit in the touch sensing mode is used to output the driving signals into the sensor electrodes having serial numbers from 1 to N and placed along the first axis, and the sensing circuit in the touch sensing mode is used to receive the sensing signals from the sensor electrodes having serial numbers from 1 to M and placed along the second axis; and, the sensing circuit in the stylus detection mode is used to receive the sensing signals from the enabled portion of sensor electrodes being placed along the first axis and having serial numbers from n1 to n2, n1 and n2 being not greater than N.

16. The touch controller of claim 15, wherein the sensing circuit in the stylus detection mode is used to receive the sensing signals from the enabled portion of sensor electrodes being placed along the second axis and having serial numbers from m1 to m2, m1 and m2 being not greater than M.

17. A method of a touch controller for controlling a touch panel device, the touch panel device comprising multiple sensor electrodes, and the method comprises;

providing a dual mode in which a capacitive touch sensing operation in a touch sensing mode is used to sense an object's touch position while an active pen detection in a stylus detection mode is used to detect an active pen's signal;

using a driving circuit to output driving signals into sensor electrodes placed along a first axis in the touch sensing mode;

using a sensing circuit to receive sensing signals from sensor electrodes placed along a second axis in the touch sensing mode; and in the stylus detection mode, dynamically determining and enabling a portion of sensor electrodes for sensing the active pen according to the object's touch position sensed by the capacitive touch sensing operation.

18. The method of claim 17, further comprising:

in the touch sensing mode, using the driving circuit to output the driving signals into the sensor electrodes having serial numbers from 1 to N and placed along the first axis;

in the touch sensing mode, using the sensing circuit to receive the sensing signals from the sensor electrodes having serial numbers from 1 to M and placed along the second axis; and in the stylus detection mode, using the sensing circuit to receive the sensing signals from the enabled portion of sensor electrodes being placed along the first axis and having serial numbers from n1 to n2, n1 and n2 being not greater than N.

19. The method of claim 18, further comprising:

in the stylus detection mode, using the sensing circuit to receive the sensing signals from the enabled portion of sensor electrodes being placed along the second axis and having serial numbers from m1 to m2, m1 and m2 being not greater than M.

20. A method of a touch controller for controlling a touch panel device, the touch panel device comprising multiple sensor electrodes, and the method comprises;

providing a dual mode in which a capacitive touch sensing operation in a touch sensing mode is used to sense an object's touch position while an active pen detection in a stylus detection mode is used to detect an active pen's signal;

using a driving circuit to output driving signals into sensor electrodes placed along a first axis in the touch sensing mode;

using a sensing circuit to receive sensing signals from sensor electrodes placed along a second axis in the touch sensing mode; and in the stylus detection mode, dynamically determining a sensor electrode scan time for sensing the active pen according to the object's touch position sensed by the capacitive touch sensing operation.

* * * * *